| United States Patent Office | 3,671,237 |
|---|---|
| | Patented June 20, 1972 |

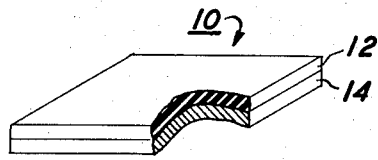
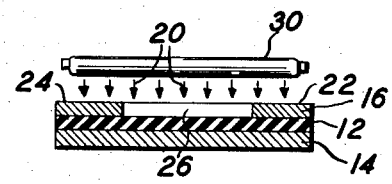
FIG. 1  FIG. 2
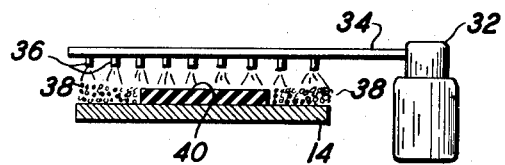
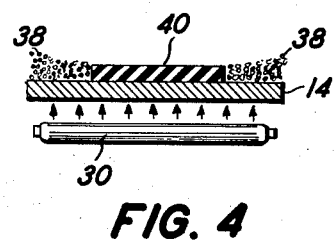
FIG. 3  FIG. 4
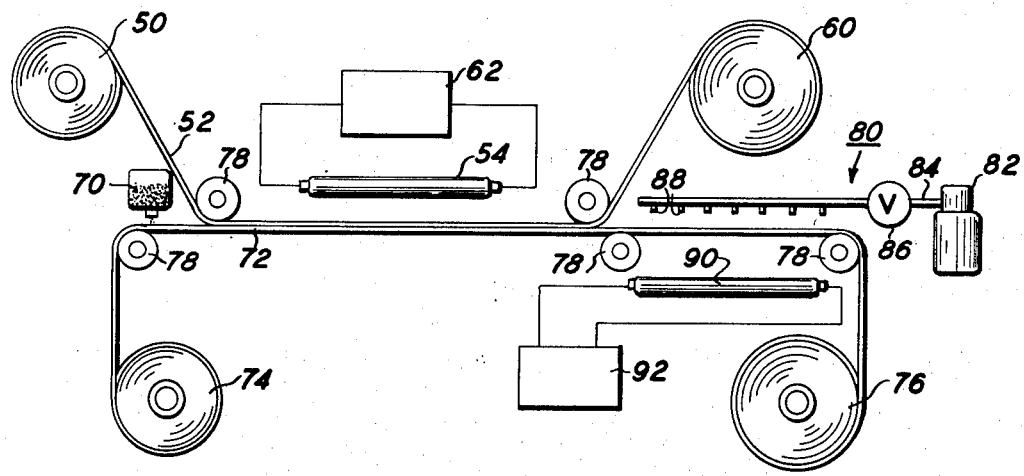
FIG. 5
INVENTORS
WERNER E. L. HAAS
JAMES E. ADAMS
BY BELA MECHLOWITZ
*Irving Keschner*
ATTORNEY

3,671,237
METHOD FOR PRODUCING IMAGES
Werner Erwin Louis Haas and James Ewing Adams, Webster, and Bela Mechlowitz, Rochester, N.Y., assignors to Xerox Corporation, Rochester, N.Y.
Filed June 9, 1969, Ser. No. 831,449
Int. Cl. G03c 5/04
U.S. Cl. 96—27
1 Claim

ABSTRACT OF THE DISCLOSURE

Method and apparatus for producing an image wherein a layer of radiation absorbing particles is caused to differentially adhere to the surface of a substrate in an imagewise pattern in areas of the layer exposed to radiation.

BACKGROUND OF THE INVENTION

Although many photographic systems are known today, all suffer from one shortcoming or another. For example, some require expensive and complex initial preparation of the photosensitive medium while others suffer from deficiencies in resolution capabilities, spectral sensitivity and the like. In addition to the aforementioned shortcomings of many of the present-day photographic systems, complex, expensive and time consuming additional processing is generally required to produce a visible image from the latent image produced on the photosensitive medium after its exposure to light.

The most common of the aforementioned photographic systems are ordinary photographing and blueprinting techniques which utilize a chemical reaction wherein the color of the photosensitive material is changed by the action of light. Chemical compositions have been utilized for making photographic relief images of particular use in the graphic arts, such as for printing plates, printed circuit boards, nameplates, chemical milling, etc. This method utilizes light to alter the hardness, tackiness, solvent resistance or ink receptivity of the chemical composition. Other methods have come into the use in recent years which rely on electrical properties of photoconductive materials rather than on chemical properties, such as that utilized in the xerographic process. In the xerographic process, a layer of photoconductive mateial is exposed to a pattern of light and shadow and the resulting electrical pattern is used to control the selective attraction or repulsion of some form of marking material to the photoconductive layer. A recent technique for forming an image or storing information involves the deformation of a thermoplastic in accordance with a pattern of light and shadow.

The imaging methods recited hereinabove require complex, time consuming and expensive steps after exposure to develop a visible image. In ordinary photography, further chemical steps are necessary to develop the image. In the method of making photographic relief images, an image is developed after placing the exposed chemical composition in a solvent. In the xerographic process, as is well known, charge placed on the photoconductive surface is selectively discharged according to an image pattern of light and shadow. The charge image is then developed by applying suitable toner thereto, the toner image being transferred to a receiving sheet.

As stated hereinabove, in the ordinary photographic process a rapid and economical method to make positive prints from ordinary negatives has yet to be developed. The positive prints presently require expensive and complex initial preparation and in addition, require development in an environment without ambient light.

SUMMARY OF THE PRESENT INVENTION

The present invention provides a novel method for producing images from an information bearing original, such as a photographic negative, which comprises exposing an imaging member comprising a layer of radiation absorbing particles overlying one surface of a substrate to an imagewise configuration of radiation wherein an image is formed on the surface of the substrate. The image is subsequently developed by applying pressurized gas to the surface of the substrate or exposing the other surface of the substrate to a source of radiation.

It is, therefore, an object of this invention to provide novel imaging method and apparatus.

It is a further object of the present invention to provide novel method and apparatus for producing images rapidly, simply, and economically.

It is still a further object of the present invention to provide novel imaging method and apparatus wherein a layer of radiation absorbing particles overlying a substrate is exposed to an imagewise pattern of radiation and wherein the latent image formed on the surface of the substrate is subsequently developed.

DESCRIPTION OF THE DRAWINGS

For a better understandingg of the invention as well as other objects and further features thereof, reference is made to the following description which is to be read in conjunction with the accompanying drawings wherein:

FIG. 1 is a perspective and sectional view of the novel imaging member of the present invention;

FIG. 2 is a sectional view of the imaging member shown in FIG. 1 as it is being exposed to radiation;

FIG. 3 illustrates an embodiment for developing the latent image formed when the imaging member is exposed to radiation;

FIG. 4 illustrates another embodiment for developing the images formed when the imaging member is exposed to radiation; and FIG. 5 shows apparatus utilizing the novel imaging and developing techniques of the present invention.

DESCRIPTION OF A PREFERRED EMBODIMENT

Referring now to FIG. 1, there is shown the novel imaging member of the present invention. The imaging member 10 comprises a layer of radiation absorbing lamp black particles 12 which are deposited upon a suitable substrate 14. Any other suitable radiation absorbing particles may be used. Typical radiation absorbing particles include organic pigments, such as Watchung Red B, a barium salt of 1-(4'-methyl-5'-chloroazobenzene-2'-sulfonic acid)-2-hydroxy-3-naphtoic acid, C. I. No. 15865 and Naphthol Red B, 1-(2'-methoxy-5'-nitrophenylazo)-2-hydroxy-3''-nitro-3-naphthanilide, C. I. No. 12355, and inorganic particles, such as carbon black, cadmium sulfide, zinc oxide, sulphur, selenium, zinc sulphide, and cadmium sulfoselenide. Examples of suitable substrates which may be utilized in the present invention include bond paper, vellum paper, plastic coated paper, glass, and polyethylene terephthalate. Layer 12 may be deposited upon substrate 14 by any suitable method of deposition such as forming a layer of separate fine particles, as for example, by grinding up the radiation absorbing particles and dusting it onto substrate 14, vapor and vacuum deposition, dipping, spraying or roller coating.

The phrase "radiation absorbing particles" as herein utilized refers to particles which increase their adherence to the substrate when they are exposed to electromagnetic radiation of a wavelength which they absorb.

Referring now to FIG. 2, a mask 16 may be an image bearing photographic negative having areas opaque and transparent to radiation incident thereon, is placed in contact with the radiation absorbing layer 12. It is to be noted that the mask 16 may be separated from layer 12 by a thin space or, alternately, an optical system for projecting an image may be placed between mask 16 and layer 12. The resultant combination of layer 12, substrate 14 and mask 16 is exposed to a short pulse of radiation, such as that generated by xenon flash lamp or laser 30, represented by arrows 20. The source of radiation as herein utilized is commercially available and should be capable of generating radiant energy for short periods of time as from about one microsecond to about ten milliseconds. In FIG. 2, areas 22 and 24 correspond to the opaque areas of the mask while area 26 corresponds to the transparent area of the mask. The energy generated by the source 30 is of an intensity such as to cause the particles in layer 12 to differentially adhere to the substrate 14 in the exposed and unexposed areas of layer 12. The adhesive force between the exposed particles and the surface of the substrate is greater than the adhesive force between the unexposed particles and the substrate surface. The exact physical mechanism which causes the differential adhesion of the particles to substrate 14 is not fully understood although selective fusing of the particles is not involved as it has been determined experimentally that the temperatures required for selective fusing were not attained although differential adhesion occurred.

The range of radiant energies which have been successfully utilized to cause differential adhesion of lamp black particles to the substrate range from about .001 to about 0.4 joule per square centimeter. However, it is to be recognized that these energy ranges are exemplary and higher or lower energies may be successfully used, depending upon the type of particles which comprise the radiation absorbing layer 12. The time duration of the radiation generated by source 30 is preferably in the range from about one microsecond to about ten milliseconds.

As shown in FIG. 3, a method for developing the latent image formed on the surface of substrate 12 after exposure to radiation source 30 is shown. The image is developed by applying a high pressure jet of gas, such as air, onto the surface of substrate 14. A source of pressurized air or gas, such as from aerosol container 32, supplies gas through tube or conduit 34 to jets 36. The gas is exhausted upon the surface of substrate 14 with a force sufficient to disperse and remove the particles in the unexposed areas 38 of the layer from substrate 14 while area 40, corresponding to the exposed area, is not disturbed. Although not shown in FIG. 3, means may be provided for collecting the particles as they are being dispersed by the gas so that jets 36 are not clogged by the particles and to enable the particles to be reused.

As shown in FIG. 4, the image areas on substrate 14 may be developed by applying radiant energy, such as from a xenon flash lamp or laser 30, to the opposite side of substrate 14, thereby removing the particles from the unexposed areas 38 of the layer 12. In this method of development, substrate 14 should be transparent to the development radiation. A glass substrate, for example, will meet this condition. The range of radiant energies which have successfully developed images range from about .0005 to about 0.3 joule per square centimeter. It is to be recognized that these energy ranges are exemplary and higher energies may be utilized, depending upon the type of particles which comprise layer 12.

The image areas on substrate 14 may also be developed by placing layer 12 in a box containing an abrasive, such as sand or aluminum oxide, and shaking or vibrating the box.

The image formed on the surface of substrate 14 may be made more permanent by applying a plastic coating, such as Krylon spray (a colorless plastic believed to be an acrylic resin, and available from Krylon, Inc.) on substrate 14, or, if the substrate is plastic coated, by flashing either side of the substrate with a xenon flash lamp or laser, the exposed or image areas 40 of the layer being fused to the plastic surface of the substrate 14. In the embodiment shown in FIG. 4, if substrate 14 is plastic coated, removal of the unexposed particles and fusing of the exposed particles may be accomplished in one step as the energy of the flash lamp 30 is increased to first cause removal and then fusing.

It is to be noted that although the discussion hereinabove relates to latent images formed on the surface of substrate 14, it has been found that a visible image may be developed at energy intensities greater than 0.3 joule per square centimeter. However, the images are barely visible and the developing techniques described hereinabove were necessary to produce quality images having good tonal characteristics.

Referring now to FIG. 5, there is shown apparatus which may utilize the novel imaging and developing techniques of the present invention. A supply roll 50 containing a mask, such as image bearing transparency 52, is conveyed past source of radiation 54 by take up spool 60. Source 54, which may comprise a xenon flash lamp or laser as described herein above, produces a short duration pulse of radiant energy when energized by a high voltage source 62. The novel imaging member of the present invention, as described hereinabove, comprises a layer of radiation absorbing particles overlying a substrate. As shown in FIG. 5, a suitable substrate, such as plastic coated paper 72, is conveyed from supply roll 74 past source 54 by take up spool 76. The radiation absorbing particles, such as lamp black, may be applied to substrate 72 from hopper 70. Radiation source 54 is energized by source 62 when a predetermined portion, such as a frame of a film to be developed, of transparency 52 reaches the area under radiation source 54, thereby exposing the novel imaging member of the present invention as described hereinabove. After the image bearing transparency and the novel imaging member of the present invention are exposed by flash lamp or laser 54, the imaging member is conveyed to the development station wherein the unexposed particles on substrate 72 are removed. The removal of the unexposed particles may be accomplished by utilizing developing means 80 which comprises a pressurized source of gas 82, conduit 84, servo valve 86 and gas jets 88, as described with reference to FIG. 3 hereinabove. The servo valve 86 is controlled by an electrical signal to insure that the gas is exhausted on substrate 72 at the appropriate time after the exposure of the imaging member. Alternately, the image may be developed by energizing flash lamp 90 by voltage source 92, as described with reference to FIG. 4 hereinabove or by conveying substrate 72 through a movable, abrasive containing box or enclosure whereby relative motion between the abrasive particles and substrate 72 removes the unexposed lamp black particles from the substrate. It is to be noted that the signals and switching means for energizing the flash lamps or lasers, servo valve and driving means for the supply rolls and take up spools have not been shown as it would be obvious to one of ordinary skill in the art. Reference numeral 78 indicates the guide rollers utilized to guide the transparency and substrate.

The invention described herein above provides a simple, economical and rapid technique for producing images, and in particular, for producing positive prints from photographic negatives. The positive prints are "dry," as the term is commonly used in the imaging art, and may be produced in ambient light, thereby eliminating the necessity of "dark rooms" utilized in present photographic film development.

What is claimed is:
1. A method of forming an image comprising the steps of:
  exposing a layer of radiation absorbing particles overlying the surface of a substrate to radiation through a mask; said substrate being characterized in that it is not softened when exposed to said radiation, said mask having areas substantially opaque and substantially opaque and substantially transparent to said radiation incident thereupon, the areas of the layer corresponding to said transparent areas of said mask being exposed to said radiation, said radiation being generated for a period from about one microsecond to about ten milliseconds and in the energy density range from about .001 to about 0.4 joule per square centimeter, the temperature attained by said particles being insufficient to cause the particles to fuse to said substrate, the exposed particles adhering to said substrate with a force greater than that between the unexposed particles and said substrate, and removing the nonexposed particles from the surface of said substrate whereby the exposed particles remaining on said surface form said image.

References Cited

UNITED STATES PATENTS

| | | | |
|---|---|---|---|
| 2,297,691 | 10/1942 | Carlson | 96—36 X |
| 2,503,758 | 4/1950 | Murray | 96—35 X |
| 3,298,833 | 1/1967 | Gaynor | 96—27 |
| 3,396,401 | 8/1968 | Nonomura | 250—65 T X |
| 3,480,965 | 11/1969 | Zappoth et al. | 250—65 T X |

OTHER REFERENCES

Roshon, D. D., Jr., et al.—Display Device Using Laser Beams, Pub. 1964 in IBM Technical Disclosure Bulletin, vol. 7, No. 3, August 1964, p. 225.

DAVID KLEIN, Primary Examiner

U.S. Cl. X.R.

250—65 T